US012625499B2

(12) United States Patent
Trezzini et al.

(10) Patent No.: US 12,625,499 B2
(45) Date of Patent: May 12, 2026

(54) METHOD FOR ESTIMATING THE ROTOR TORQUES OF AN AIRCRAFT CAPABLE OF HOVERING AND CONTROL UNIT FOR AN AIRCRAFT CAPABLE OF HOVERING

(71) Applicant: LEONARDO S.P.A., Rome (IT)

(72) Inventors: Alberto Angelo Trezzini, Samarate (IT); Ahmad Mohamad Haidar, Samarate (IT)

(73) Assignee: LEONARDO S.P.A., Rome (IT)

( * ) Notice: Subject to any disclaimer, the term of this patent is extended or adjusted under 35 U.S.C. 154(b) by 72 days.

(21) Appl. No.: 18/719,563

(22) PCT Filed: Oct. 20, 2022

(86) PCT No.: PCT/IB2022/060086
§ 371 (c)(1),
(2) Date: Jun. 13, 2024

(87) PCT Pub. No.: WO2023/126701
PCT Pub. Date: Jul. 6, 2023

(65) Prior Publication Data
US 2025/0051037 A1      Feb. 13, 2025

(30)      Foreign Application Priority Data
Dec. 27, 2021      (EP) ..................................... 21217859

(51) Int. Cl.
| | |
|---|---|
| B64F 5/60 | (2017.01) |
| B64D 31/00 | (2006.01) |
| G05D 1/00 | (2006.01) |

(52) U.S. Cl.
CPC ........... G05D 1/0858 (2013.01); B64D 31/00 (2013.01); B64F 5/60 (2017.01)

(58) Field of Classification Search
CPC ....... B64D 31/00; B64F 5/60; B64C 29/0033; F02C 6/206; F02C 9/00; F05D 2200/11;
(Continued)

(56) References Cited

U.S. PATENT DOCUMENTS

| | | | | |
|---|---|---|---|---|
| 4,807,129 A | * | 2/1989 | Perks | .................... B64C 13/503 |
| | | | | 701/3 |
| 9,834,305 B2 | * | 12/2017 | Taylor | .................... B64U 30/10 |

(Continued)

OTHER PUBLICATIONS

International Search Report and Written Opinion in PCT Application No. PCT/IB2022/060086, mailed Dec. 23, 2022 (12 pages).
(Continued)

*Primary Examiner* — Mussa A Shaawat
(74) *Attorney, Agent, or Firm* — Leason Ellis LLP

(57)      ABSTRACT

A method for estimating rotor torques of an aircraft capable of hovering and comprising a plurality of rotors, which are rotatable under the action of respective rotor torques; and an engine, which is operatively connected to the rotors to provide them with an engine torque. Each rotor comprises a hub and a plurality of blades articulated on the respective hub in such a way that respective collective pitch angles are adjustable. The method comprises the steps of i) calculating a symmetric component on the basis of the engine torque; ii) receiving a signal associated with collective pitch angles; iii) calculating an asymmetric component on the basis of a pitch angle difference between the collective pitch angles; and iv) calculating each rotor torque as the algebraic sum of the symmetric component and the respective asymmetric component.

16 Claims, 8 Drawing Sheets

(58) Field of Classification Search
      CPC .......... F05D 2220/90; F05D 2270/335; G05D
                                          1/49; G05D 2109/23
      See application file for complete search history.

(56)                   References Cited

U.S. PATENT DOCUMENTS

|  |  |  |  |  |
|---|---|---|---|---|
| 9,988,147 | B2 * | 6/2018 | Taylor | B64U 30/10 |
| 11,724,802 | B1 * | 8/2023 | Messinger | B64C 29/0033 |
|  |  |  |  | 244/7 C |
| 11,834,196 | B2 * | 12/2023 | Adibhatla | F02K 5/00 |
| 11,952,110 | B1 * | 4/2024 | Hinman | B64C 27/68 |
| 2004/0093130 | A1 * | 5/2004 | Osder | G05D 1/0858 |
|  |  |  |  | 244/175 |
| 2010/0252690 | A1 * | 10/2010 | Hothi | B64U 50/19 |
|  |  |  |  | 244/75.1 |
| 2010/0264256 | A1 * | 10/2010 | Yim | B64C 29/0033 |
|  |  |  |  | 416/123 |
| 2013/0332022 | A1 * | 12/2013 | Green | B64C 27/008 |
|  |  |  |  | 701/29.1 |
| 2015/0014475 | A1 * | 1/2015 | Taylor | B64C 29/0025 |
|  |  |  |  | 244/6 |
| 2015/0367950 | A1 * | 12/2015 | Rajashekara | F02C 7/32 |
|  |  |  |  | 903/930 |
| 2016/0122039 | A1 * | 5/2016 | Ehinger | G01L 3/101 |
|  |  |  |  | 73/862.08 |
| 2016/0137298 | A1 * | 5/2016 | Youngblood | A63H 27/12 |
|  |  |  |  | 244/17.23 |
| 2017/0336809 | A1 * | 11/2017 | Hein | B64C 29/02 |
| 2017/0355455 | A1 * | 12/2017 | Taylor | B64U 70/80 |
| 2018/0073441 | A1 * | 3/2018 | Cai | F02C 9/54 |
| 2018/0334251 | A1 * | 11/2018 | Karem | B64C 29/0033 |
| 2019/0263515 | A1 * | 8/2019 | Karem | B64C 3/56 |
| 2019/0300152 | A1 * | 10/2019 | Choi | B64C 11/06 |
| 2021/0108595 | A1 * | 4/2021 | Khalid | F04D 29/563 |
| 2021/0147076 | A1 * | 5/2021 | Stearns | B64C 11/44 |
| 2022/0106060 | A1 * | 4/2022 | Morrison | H01M 8/04388 |
| 2022/0119102 | A1 * | 4/2022 | Shaanan | B64C 27/54 |
| 2022/0135204 | A1 * | 5/2022 | Mehrgan | B64C 3/32 |
|  |  |  |  | 244/49 |
| 2022/0204157 | A1 * | 6/2022 | Vander Mey | B64C 27/08 |
| 2023/0234703 | A1 * | 7/2023 | Brown | B64C 11/04 |
|  |  |  |  | 244/7 R |
| 2024/0004404 | A1 * | 1/2024 | Wiegman | G05D 1/085 |

OTHER PUBLICATIONS

Wang Yong et al: "A novel control method for turboshaft engine with variable rotor speed based on the Ngdot estimator through LQG/LTR and rotor predicted torque feedforward", Chinese Journal of Aeronautics, Elsevier, Amsterdam, NL, vol. 33, No. 7, Mar. 17, 2020 (Mar. 17, 2020) , pp. 1867-1876, XP086211196, ISSN: 1000-9361, DOI: 10.1016/J.CJA.2020.01.009 [retrieved on Mar. 17, 2020] the whole document.

* cited by examiner

METHOD FOR ESTIMATING THE ROTOR TORQUES OF AN AIRCRAFT CAPABLE OF HOVERING AND CONTROL UNIT FOR AN AIRCRAFT CAPABLE OF HOVERING

CROSS-REFERENCE TO RELATED APPLICATIONS

This Patent Application is a U.S. National Phase Application under 35 U.S.C. § 371 of International Patent Application No. PCT/IB2022/060086, filed on Oct. 20, 2022, which claims priority from European Patent Application No. 21217859.4, filed on Dec. 27, 2021, all of which are incorporated by reference as if expressly set forth in their respective entireties herein.

TECHNICAL FIELD

The present invention relates to a method for estimating the rotor torques of an aircraft capable of hovering.

The present invention also relates to a control unit for an aircraft capable of hovering.

BACKGROUND

Aircraft capable of hovering, such as convertiplanes or helicopters, are known comprising:
- at least two rotors, which are operatively connected to each other and controllable independently of each other;
- at least one engine, which is operatively connected to the rotors and is adapted to provide them with an engine torque; and
- transmission units operatively connecting the engine to the rotors.

In particular, the rotors are driven in rotation by respective rotor torques, which are in general different from the engine torque for several reasons.

First, a portion of the engine torque is lost because of mechanical losses in the transmission units. In addition, a portion of the engine torque may be used to drive one or more accessories of the aircraft.

The known aircraft further comprise physical sensors arranged at the two rotors and configured to directly measure the rotor torques. However, the rotor torques measured by such sensors (e.g., strain-based torque sensors) are not consistently reliable. In addition, the use of these physical sensors in aircraft results in increased installation and maintenance costs, as well as increased weight and complexity of the aircraft.

This is especially relevant for the convertiplanes, the rotors of which are known to be tiltable relative to a reference system fixed with respect to stationary parts of the convertiplanes. Indeed, each time the rotors of the convertiplane are tilted, the physical sensors are tilted integrally with the rotors. This complicates the tilting movement of the rotors and the electrical connection of the sensors to the fixed parts of the convertiplane.

Methods have therefore been developed to estimate the rotor torques acting on each of the two rotors without the physical sensors. In particular, the methods include the steps of:
- subtracting from the engine torque the mechanical losses due to the transmission of the engine torque from the engine to the rotors; and

- subtracting from the engine torque the mechanical energy supplied by the engine to any accessories of the aircraft connected thereto.

The result of these subtractions is the total available engine torque.

The rotor torque is then estimated by dividing the total available engine torque by the number of rotors of the aircraft. In other words, the torque acting on each rotor is estimated by apportioning the total available engine torque produced by the engine equally between the two rotors.

Such an estimate can be considered sufficiently accurate under the assumption that the rotor torques acting on the two rotors are equal or substantially equal to each other.

However, the rotor torques of two independently controllable rotors may actually be significantly different from each other. For example, this may occur during particular manoeuvres of the aircraft.

As a result, the rotor torque calculated by the known estimation methods fails to give an adequate indication of the value of the torque acting on each of the two rotors, when the assumption that the rotor torques acting on the two rotors are equal or substantially equal to each other is not valid.

US-A1-2017336809 discloses a method for executing yaw control of an aircraft including two rotors. The method includes inducing helicopter yaw by creating a differential torque between the two rotors, wherein the creating of the differential torque comprises inducing a differential collective pitch to generate a differential thrust, and maintaining helicopter roll equilibrium during the inducing of the helicopter yaw by inducing a differential cyclic pitch to generate a differential lift offset.

US-A1-2016122039 discloses a method for calculating torque through a rotor mast of a propulsion system of a tiltrotor aircraft including receiving the torque applied through a quill shaft of the rotorcraft. The quill shaft is located between a fixed gearbox and a spindle gearbox, and the spindle gearbox is rotatable about a conversion access. The torque through the rotor mast is determined by using the torque through the quill shaft and the efficiency loss value between the quill shaft and the rotor mast.

In addition, a control method for turboshaft engine is disclosed in the paper "A novel control method for turboshaft engine with variable rotor speed based on the Ngdot estimator through LQG/LTR and rotor predicted torque feedforward" by WANG YONG et al. (ISSN: 1000-9361).

Therefore, a need is felt within the sector to improve the estimation of the rotor torques of an aircraft comprising at least two independently controllable and operatively connected rotors, without using any physical sensor to directly measure the rotor torques.

SUMMARY

The object of the present invention is to realise a method for estimating rotor torques, which allows the aforesaid need to be satisfied in a simple and efficient way.

According to the invention, the aforesaid object is achieved by a method for estimating rotor torques according to the present claims.

The present invention also relates to a control unit according to the present claims and to an aircraft capable of hovering according to the present claims.

BRIEF DESCRIPTION OF THE DRAWINGS

Three embodiments are described below for a better understanding of the present invention, provided by way of non-limiting example with reference to the accompanying drawings, wherein.

DESCRIPTION OF EMBODIMENTS

Figure 1:
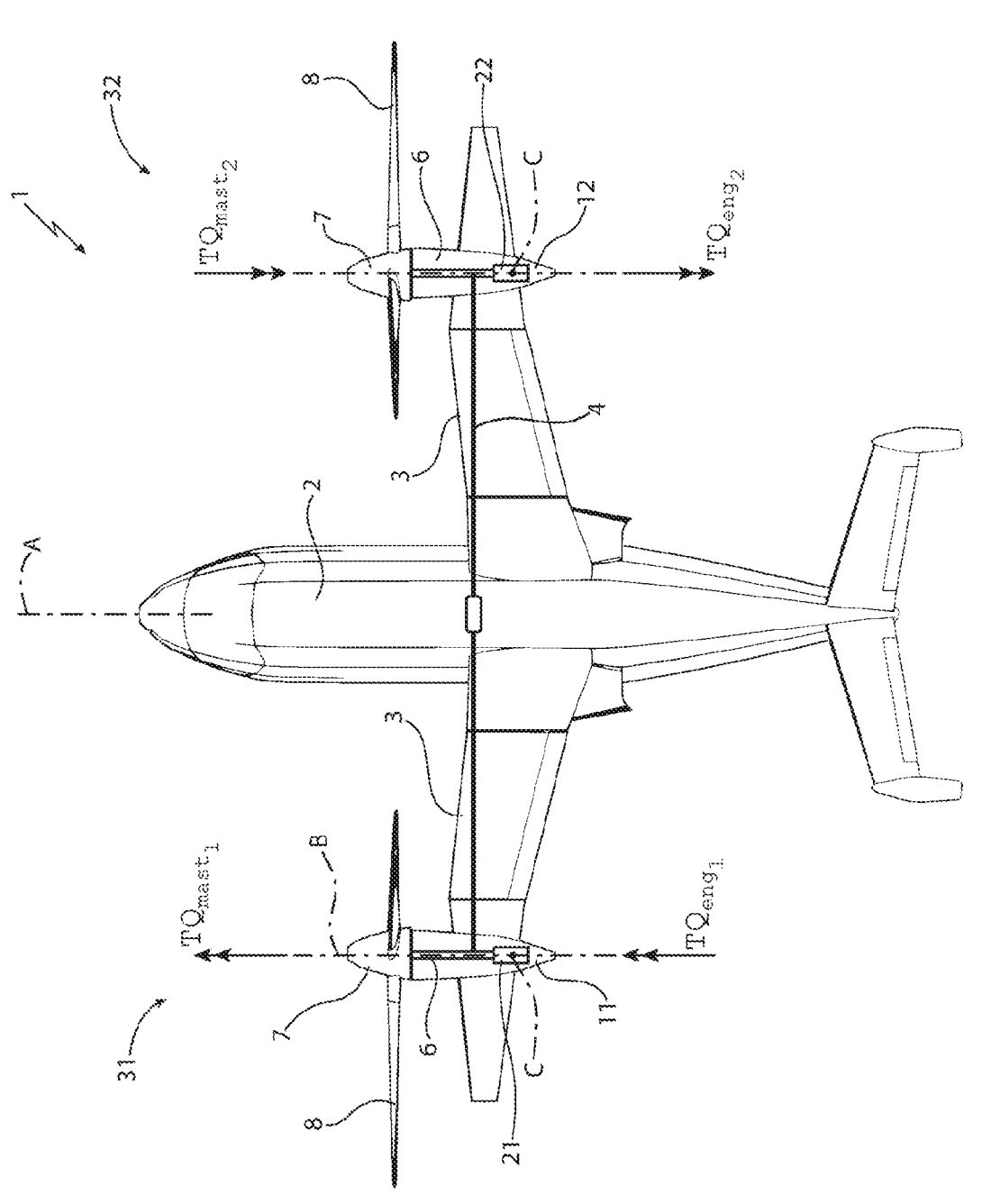
FIG. 1 shows a top view of a first embodiment of an aircraft capable of hovering, in particular a convertiplane, comprising two rotors.

With reference to FIG. 1, number 1 denotes an aircraft capable of hovering, in the shown case a convertiplane.

It should be noted that the terms "front", "longitudinal", "lateral", "above" and "below" and the like used in this description refer to a normal direction of advancement of convertiplane 1.

The convertiplane 1 essentially comprises:

a fuselage 2 having an axis A of longitudinal extension;

a pair of half-wings 3 extending cantilevered from respective parts opposite one another of fuselage 2 and transversely to axis A;

a pair of nacelles 11, 12 housing at least partially respective engines 21, 22 and attached to respective half-wings 3;

a pair of rotors 31, 32 operatively connected with the respective engines 21, 22; and a control unit 5.

Figure 4:
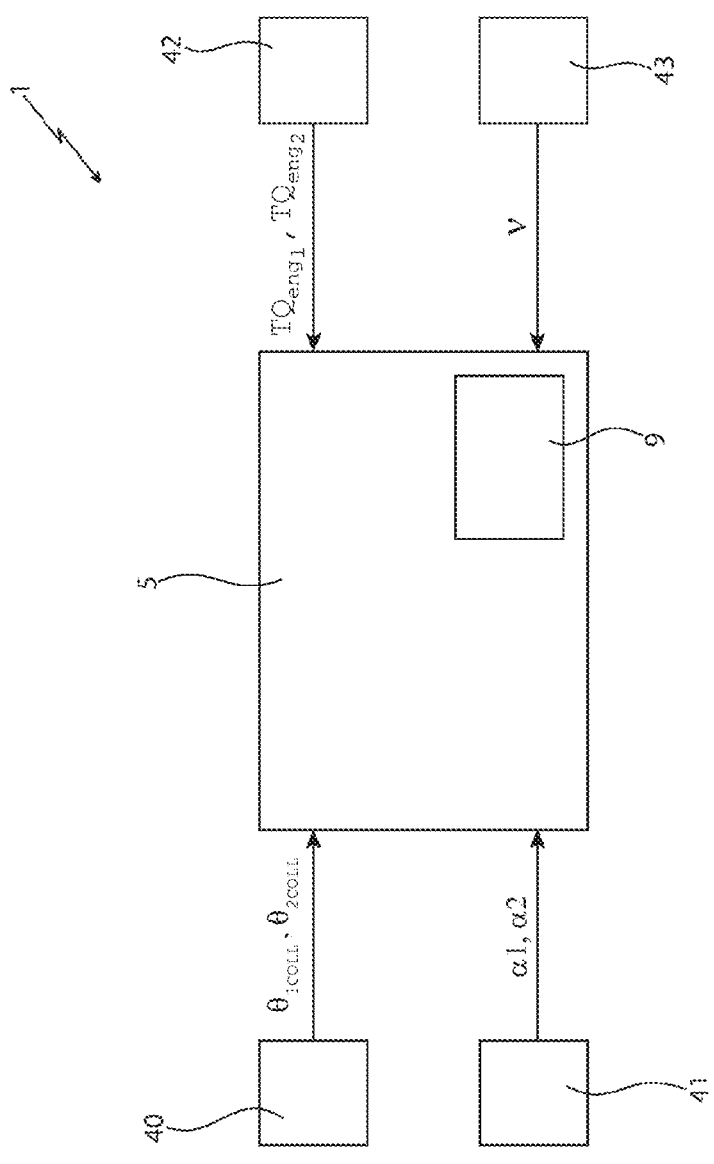
FIG. 4 is a schematic representation of some components of the aircraft of FIG. 1, with parts removed for clarity.

In detail, control unit 5 comprises in a known manner a computational unit, a memory, and one or more interface units for the electrical and operational connection to sensor means 40, 41, 42, 43 of aircraft 1, which will be described in detail in the following (FIG. 4).

Each rotor 31, 32 essentially comprises a hub 7 and a plurality of blades 8.

Convertiplane 1 further comprises two transmission units 6, which are each operatively connected to a respective engine 21, 22 and the relative hub 7, to drive it in rotation. In particular, rotors 31, 32 are rotatable about respective axes B with respective angular speeds $\omega 1$, $\omega 2$. Preferably, angular speeds $\omega 1$, $\omega 2$ are constant over time.

Furthermore, blades 8 are articulated on the respective hub 7 in such a way that respective angles of attack $\theta 1_{COLL}$, $\theta 2_{COLL}$ are collectively adjustable relative to respective axes B.

In the industry, angles of attack $\theta 1_{COLL}$, $\theta 2_{COLL}$ are commonly known as "collective pitch angles" and will therefore be referred to that way in the following.

Rotors 31, 32 are controllable independently of each other. In particular, the collective pitch angles $\theta 1_{COLL}$ and $\theta 2_{COLL}$ may be different from each other.

More specifically, as the collective pitch angles $\theta 1_{COLL}$, $\theta 2_{COLL}$ of one rotor 31, 32 increases, the thrust exerted by the rotor 31, 32 parallel to axis B and the drag torque acting on the rotor 31, 32 correspondingly increases. As a result, angular speeds $\omega 1$, $\omega 2$ remain substantially constant.

Furthermore, rotors 31, 32 are identical to each other. In detail, rotors 31 and 32 have the same power required for the same input. This means, in further detail, that for a given collective input and a given boundary condition, the torque required to rotate rotors 31 and 32 is the same or substantially the same, for all inputs and operating conditions.

Convertiplane 1 further comprises sensor means 40 configured to measure collective pitch angles $\theta 1_{COLL}$, $\theta 2_{COLL}$ of respective rotors 31, 32. Sensor means 40 are configured to generate a signal associated with collective pitch angles $\theta 1_{COLL}$, $\theta 2_{COLL}$ and are operatively connected to control unit 5 (FIG. 4).

Furthermore, rotors 31, 32 are tiltable with respect to respective axes C relative to half-wings 3. In particular, axes C are transverse to axis A and axes B (FIG. 1).

It is important to note that axes A, B and C are fixed with respect to convertiplane 1.

Therefore, convertiplane 1 can be selectively arranged:

in a "helicopter" configuration (not shown), wherein axes B of rotors 31, 32 are orthogonal to axis A and parallel to axes C; and in an "airplane" configuration (shown in FIG. 1), wherein axes B of rotors 31, 32 are parallel to axis A and orthogonal to axes C.

In detail, it is possible to define angles $\alpha 1$, $\alpha 2$ corresponding respectively to the orientation of rotational axes B with respect to axis A.

Convertiplane 1 further comprises sensor means 41 configured to measure angles $\alpha 1$, $\alpha 2$ of respective rotational axes B of rotors 31, 32 with respect to axis A. In detail, sensor means 41 are configured to generate a signal associated with angles $\alpha 1$, $\alpha 2$ and are operatively connected to control unit 5 (FIG. 4).

In the embodiment shown, rotors 31, 32 are tiltable with respect to respective axes C integrally with respective nacelles 11, 12. Therefore, sensor means 41 are also configured to detect nacelle angles of nacelles 11, 12 corresponding to the orientation of nacelles 11, 12 with respect to axis A.

Each engine 21, 22 is adapted to generate a respective engine torque $TQ_{eng1}$, $TQ_{eng2}$, which is transmitted at least in part to rotors 31, 32 by transmission units 6. In addition, each rotor 31, 32 is rotatable relative to the respective rotational axis B under the action of respective rotor torques $TQ_{mast1}$, $TQ_{mast2}$, which are correlated to engine torques $TQ_{eng1}$ and/or $TQ_{eng2}$.

In particular, in the event of an increase in engine torques $TQ_{eng1}$, $TQ_{eng2}$, collective pitch angles $\theta 1_{COLL}$, $\theta 2_{COLL}$ are increased in such a way that angular speeds $\omega 1$, $\omega 2$ are kept constant due to the corresponding increase in the drag torques acting on rotors 31, 32.

Furthermore, rotors 31, 32 are operatively connected to each other. In particular, convertiplane 1 comprises an interconnection shaft 4, which is operatively connected to rotors 31 and 32 (FIG. 1).

Interconnection shaft 4 is adapted to allow the rotation of rotors 31, 32 in case of failure of one of engines 21, 22.

In a known manner, interconnection shaft 4 is adapted to:

allow at least part of engine torques $TQ_{eng1}$, $TQ_{eng2}$ to be transmitted between transmission units 6 of rotors 31 and 32; and allow rotors 31, 32 to tilt with respect to the respective axis C.

Each rotor torque $TQ_{mast1}$, $TQ_{mast2}$ is in general different from engine torques $TQ_{eng1}$, $TQ_{eng2}$ for several reasons, which will be described in the following.

In particular, at least part of engine torques $TQ_{eng1}$, $TQ_{eng2}$ transmitted by transmission unit 6 is dissipated because of mechanical losses occurring at transmission unit 6.

In addition, convertiplane 1 may comprise a plurality of not-shown accessories, which perform various functions on board the convertiplane and require a certain amount of power to be operated.

The accessories are at least indirectly operatively connected to engines 21 and/or 22 to receive the power necessary for their operation. In particular, engines 21 and/or 22 are adapted to provide the accessories with a torque $TQ_{acc}$ for powering them.

Furthermore, convertiplane 1 comprises (FIG. 4):

sensor means 42 configured to measure engine torques $TQ_{eng1}$, $TQ_{eng2}$ generated by respective engines 21, 22; and sensor means 43 configured to measure the airspeed v of convertiplane 1.

Sensor means 42 and 43 are operatively connected to control unit 5 and are adapted to generate respective signals associated with the measured values of engine torques $TQ_{eng1}$, $TQ_{eng2}$ and airspeed v of convertiplane 1.

Control unit 5 is configured to calculate a first component $TQ_{mastSYM}$ of rotor torques $TQ_{mast1}$, $TQ_{mast2}$ on the basis of engine torques $TQ_{eng1}$, $TQ_{eng2}$. In detail, first component $TQ_{mastSYM}$ is equal to rotor torques $TQ_{mast1}$, $TQ_{mast2}$ when collective pitch angles $\theta1_{COLL}$, $\theta2_{COLL}$ are equal to each other.

For the purpose of calculating first component $TQ_{mastSYM}$, control unit 5 is configured to (FIG. 2):

receive from sensor means 42 the signal associated with the measured values of engine torques $TQ_{eng1}$, $TQ_{eng2}$;

calculating a total engine torque $TQ_{engTOT}$ generated by engines 21 and 22 as the sum of the engine torques $TQ_{eng1}$, $TQ_{eng2}$ (block 50);

subtracting from the total engine torque $TQ_{engTOT}$ a term corresponding to the transmission losses due to the transmission of engine torques $TQ_{eng1}$, $TQ_{eng2}$ (or part thereof) from engines 21, 22 to rotors 31, 32 (block 51) through transmission unit 6; and/or subtracting from the total engine torque $TQ_{engTOT}$ the torque $TQ_{acc}$ for powering the accessories of convertiplane 1, where present (block 52).

In particular, control unit 5 may be configured to subtract the term corresponding to the transmission losses from the total engine torque $TQ_{engTOT}$ by multiplying total engine torque $TQ_{engTOT}$ by a mechanical loss coefficient $\eta_{XMNS}$ ($\eta_{XMNS}<1$).

The difference between total engine torque $TQ_{engTOT}$ and the transmission losses and/or torque $TQ_{acc}$ is the total available engine torque $TQ_{engavail}$.

Figure 2:
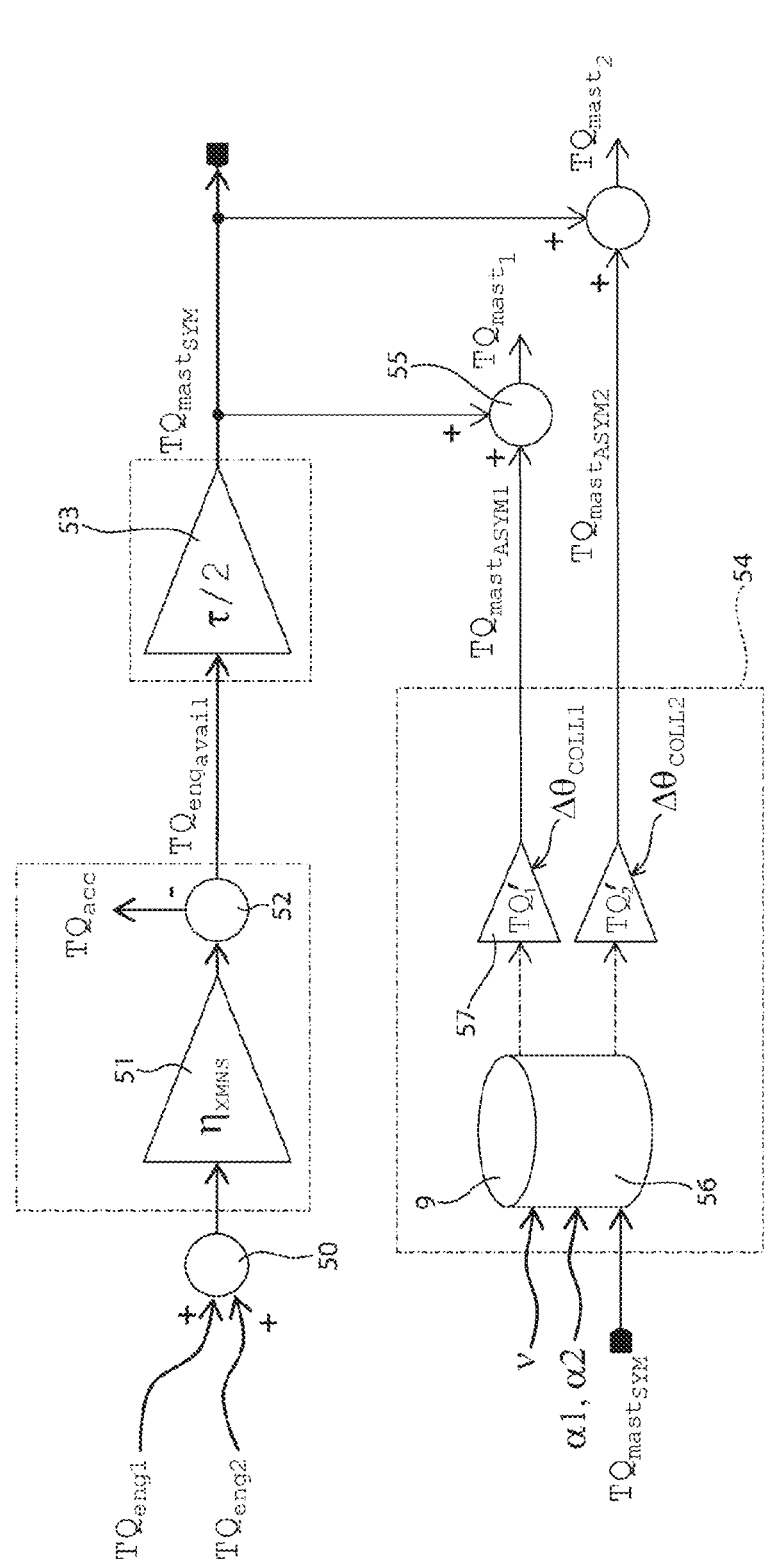
FIG. 2 is a block diagram related to a method according to the present invention for estimating the torques of the aircraft of FIG. 1.

Control unit 5 is further configured to calculate first component $TQ_{mastSYM}$ by dividing the total available engine torque $TQ_{engavail}$ by two, which is the number of rotors 31, 32 of convertiplane 1 (block 53 in FIG. 2).

Advantageously, control unit 5 is configured to:

receive the signal associated with collective pitch angles $\theta1_{COLL}$, $\theta2_{COLL}$ of rotors 31 and 32 from sensor means 40; and calculate a second component $TQ_{mastASYM1}$, $TQ_{mastASYM2}$ of respective rotor torques $TQ_{mast1}$, $TQ_{mast2}$ on the basis of at least a respective pitch angle difference $\Delta\theta_{COLL1}$, $\Delta\theta_{COLL2}$ between collective pitch angles $\theta1_{COLL}$ and $\theta2_{COLL}$ (block 54 of FIG. 2).

In particular, second components $TQ_{mastASYM1}$, $TQ_{mastASYM2}$ respectively represent how much the rotor torque $TQ_{mast1}$, $TQ_{mast2}$ of each rotor 31, 32 deviates from the rotor torque that would act on each rotor 31, 32 if total available engine torque $TQ_{engavail}$ were equally apportioned between rotors 31 and 32. Accordingly, first component $TQ_{mastSYM}$ and second components $TQ_{mastASYM1}$, $TQ_{mastASYM2}$, may be referred respectively to as a "symmetric component" and an "asymmetric components" of rotor torques $TQ_{mast1}$, $TQ_{mast2}$.

The following are exemplary situations in which convertiplane 1 is in a flight condition in which total available engine torque $TQ_{engavail}$ is not equally apportioned between rotors 31 and 32:

hovering during vertical take-off and landing or during conversion of convertiplane 1 between the airplane and the helicopter configurations with steady cross wind;

nacelle angle equal to 75° with steady heading sideslip relative to a direction fixed with respect to the ground;

nacelle angle equal to 50° with steady heading sideslip relative to the direction fixed with respect to the ground;

convertiplane 1 arranged in the airplane configuration with steady heading sideslip relative to the direction fixed with respect to the ground;

bank angle different than zero and nacelle angle equal to 50° to maintain null sideslip.

Control unit 5 is further configured to calculate each rotor torque $TQ_{mast1}$, $TQ_{mast2}$ as the sum of first component $TQ_{mastSYM}$ and the respective second component $TQ_{mastASYM1}$, $TQ_{mastASYM2}$ ($TQ_{mast1}=TQ_{mastSYM}+TQ_{mastASYM1}$; $TQ_{mast2}=TQ_{mastSYM}+TQ_{mastASYM2}$) (block 55 in FIG. 2).

More specifically, for the purpose of calculating second components $TQ_{mastASYM1}$, $TQ_{mastASYM2}$ (block 54), control unit 5 is configured to (FIG. 2):

determine parameters $TQ'_1$, $TQ'_2$, which are respectively associated with the variation of rotor torques $TQ_{mast1}$, $TQ_{mast2}$ as a result of a variation of collective pitch angle $\theta1_{COLL}$, $\theta2_{COLL}$ of the same rotor 31, 32 (block 56); and multiply each parameter $TQ'_1$, $TQ'_2$ by respective pitch angle difference $\Delta\theta_{COLL1}$, $\Delta\theta_{COLL2}$ (block 57).

Pitch angle differences $\Delta\theta_{COLL1}$, $\Delta\theta_{COLL2}$ of rotors 31, 32 are respective differences between each collective pitch angle $\theta1_{COLL}$, $\theta2_{COLL}$ and a symmetric collective pitch angle $\theta0$ ($\Delta\theta_{COLL1}=\theta1_{COLL}-\theta0$; $\Delta\theta_{COLL2}=\theta2_{COLL}-\theta0$). In detail, symmetric collective pitch angle $\theta0$ is calculated as the sum of collective pitch angles $\theta1_{COLL}$, $\theta2_{COLL}$ divided by two, which is the number of rotors 31, 32 of aircraft 1 ($\theta0=(\theta1_{COLL}+\theta2_{COLL})/2$). In detail, each parameter $TQ'_1$, $TQ'_2$ may be expressed as a partial derivative of the relative rotor torque $TQ_{mast1}$, $TQ_{mast2}$ with respect to the collective pitch angle $\theta COLL$ ($TQ'_1=\partial TQ_{mast1}/\partial\theta_{COLL}$; $TQ'_2=\partial TQ_{mast2}/\partial\theta_{COLL}$). Parameters $TQ'_1$, $TQ'_2$ are variable as a function of several variables associated with the flight conditions of convertiplane 1.

In particular, the memory of control unit 5 comprises a database 9, in which data correlating parameters $TQ'_1$, $TQ'_2$ with a plurality of variables associated with the flight conditions of convertiplane 1 are stored. In detail, the data stored in database 9 may be arranged in tables and/or graphs, which are preferably multiple input tables and/or graphs (FIG. 4).

Control unit 5 is configured to:

receive a plurality of signals associated with the flight conditions of convertiplane 1;

access database 9 using the signals associated with the flight conditions as inputs; and determine parameters $TQ'_1$, $TQ'_2$ on the basis of the inputs and on the basis of the data correlating parameters $TQ'_1$, $TQ'_2$ and the variables associated with the flight conditions of convertiplane 1 stored in database 9.

More specifically, the data stored in database 9 are calculated or experimentally measured in a known manner by means of statistical methods or by test on the basis of one or more sets of the following variables of convertiplane 1:

airspeed;

torque settings;

nacelle angle;

rotor speed;

altitude;

ambient temperature;

number of operative engines 21, 22.

Figure 3:
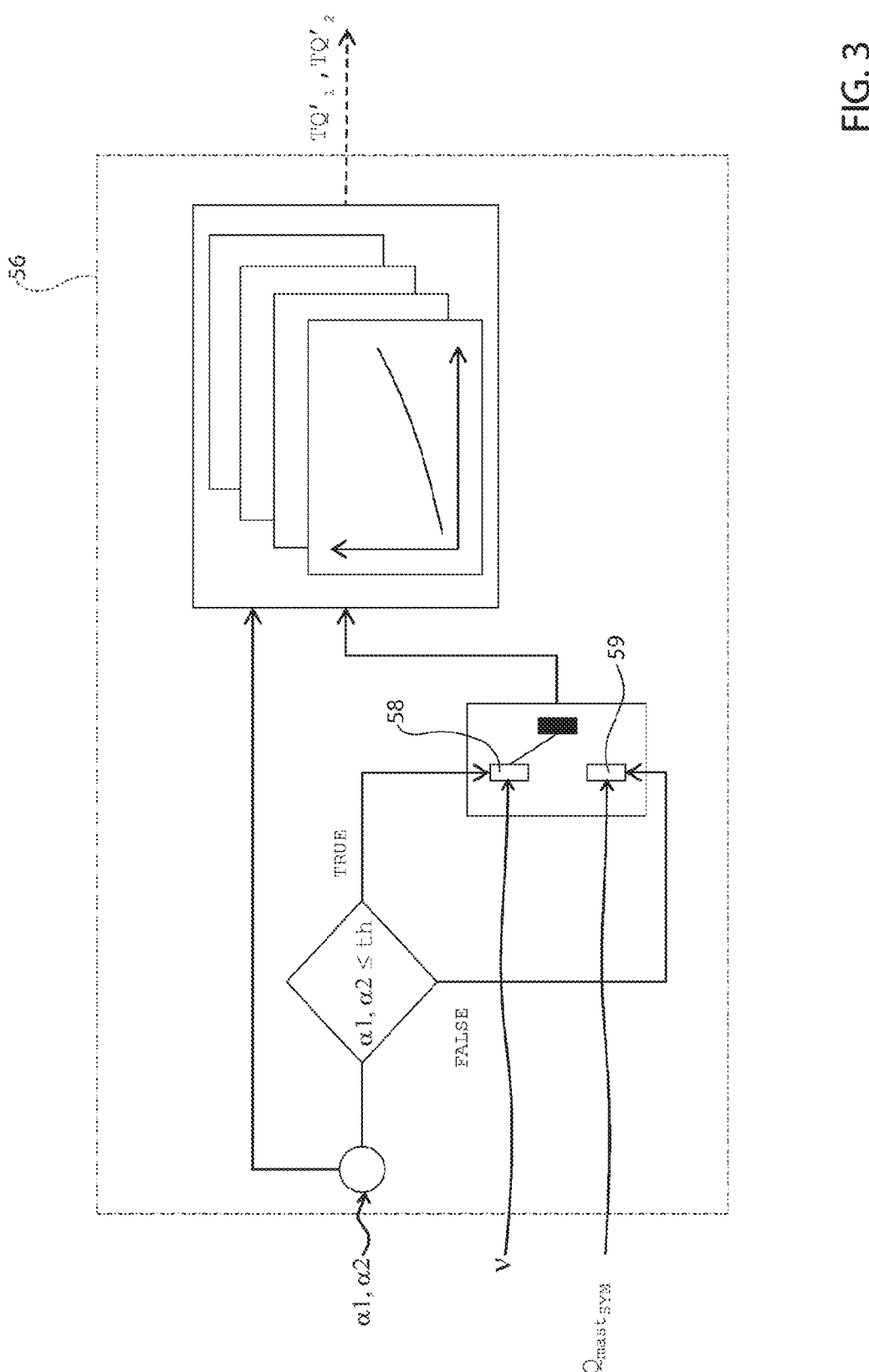
FIG. 3 is a detail of the block diagram of FIG. 2.

With reference to FIG. 3, control unit 5 is configured to calculate parameters $TQ'_1$, $TQ'_2$ on the basis of at least two independent variables associated with the performance of rotor 31 and/or 32.

In the embodiment shown in FIG. 3, each parameter $TQ'_1$, $TQ'_2$ is calculated on the basis of:

the angle $\alpha1$, $\alpha2$ of the respective rotor 31, 32 measured by sensor means 41; and airspeed v measured by sensor means 43; and/or first component $TQ_{mastSYM}$.

In detail, database 9 comprises data correlating parameters $TQ'_1$, $TQ'_2$ with respective angle $\alpha1$, $\alpha2$, airspeed v and first component $TQ_{mastSYM}$.

In further detail, control unit 5 is configured to (FIG. 3):

calculate parameter $TQ'_1$, $TQ'_2$ on the basis of airspeed v, if respective angle $\alpha1$, $\alpha2$ is lower than or equal to a threshold value th (block 58); and calculate parameter $TQ'_1$, $TQ'_2$ on the basis of first component $TQ_{mastSYM}$, if respective angle $\alpha1$, $\alpha2$ is greater than threshold value th (block 59).

In particular, if the collective pitch angle $\theta1_{COLL}$, $\theta2_{COLL}$ is the same for the two rotors 31, 32, the second components $TQ_{mastASYM1}$, $TQ_{mastASYM2}$ are both null and the rotor torques $TQ_{mast1}$, $TQ_{mast2}$ are equal to each other and to the first component $TQ_{mastSYM}$ ($TQ_{mast1}=TQ_{mast2}=TQ_{mastSYM}$).

In addition, since rotors 31, 32 are identical to each other and have the same power required for the same input, if angles $\alpha1$ and $\alpha2$ are equal to each other, parameters $TQ'_1$, $TQ'_2$ are also identical. In other words, if angles $\alpha1$ and $\alpha2$ are equal to each other, the variation of rotor torque $TQ_{mast1}$ as a result of a variation of collective pitch angle $\theta1_{COLL}$ is identical to the variation of rotor torque $TQ_{mast2}$ as a result of a variation of collective pitch angle $\theta2_{COLL}$.

In use, control unit 5 calculates an estimate of rotor torques $TQ_{mast1}$, $TQ_{mast2}$ with a sum of first component $TQ_{mastSYM}$ and respective second components $TQ_{mastASYM1}$, $TQ_{mastASYM2}$.

The following is a description of the steps required to calculate first component $TQ_{mastSYM}$.

In detail, sensor means 42 periodically measure engine torques $TQ_{eng1}$, $TQ_{eng2}$ and send the associated signal to control unit 5 (FIG. 4). Subsequently, control unit 5 calculates total engine torque $TQ_{engTOT}$ as the sum of the engine torques $TQ_{eng1}$, $TQ_{eng2}$ measured by sensor means 42 (block 50 in FIG. 2).

Control unit 5 then calculates total available engine torque $TQ_{engavail}$ by subtracting from total engine torque $TQ_{engTOT}$ the transmission losses due to the transmission of engine torques $TQ_{eng1}$, $TQ_{eng2}$ through transmission unit 6 (block 51 in FIG. 2) and/or the torque $TQ_{acc}$ for powering the accessories of convertiplane 1, where present (block 52 in FIG. 2).

Control unit 5 then calculates first component $TQ_{mastSYM}$ by dividing available engine torque $TQ_{engavail}$ by the number of rotors 31, 32 of convertiplane 1 (block 53 in FIG. 2).

The following is a description of the steps required to calculate second components $TQ_{mastASYM1}$, $TQ_{mastASYM2}$.

Periodically, sensor means 40 measure collective pitch angles $\theta1_{COLL}$, $\theta2_{COLL}$ of rotors 31 and 32, sensor means 41 measure angles $\alpha1$, $\alpha2$ and sensor means 43 measure airspeed v.

Control unit 5 calculates the pitch angle differences $\Delta\theta_{COLL1}$, $\Delta\theta_{COLL2}$ between collective pitch angles $\theta1_{COLL}$ and $\theta2_{COLL}$. In addition, control unit 5 accesses database 9 using angle $\alpha1$, $\alpha2$, airspeed v and/or first component $TQ_{mastSYM}$ as inputs and determines parameters $TQ'_1$, $TQ'_2$ on the basis of the data stored in database 9.

In particular, if angle $\alpha1$ is lower than or equal to threshold value th, control unit 5 calculates parameter $TQ'_1$ on the basis of angle al and airspeed v (block 58 in FIG. 3); if angle $\alpha1$ is equal to or greater than threshold value th, control unit 5 calculates parameter $TQ'_1$ on the basis of angle $\alpha1$ and first component $TQ_{mastSYM}$ (block 59 in FIG. 3). Similarly to the foregoing, if angle $\alpha2$ is lower than or equal to threshold value th, control unit 5 calculates parameter $TQ'_2$ on the basis of angle $\alpha2$ and airspeed v; if angle $\alpha2$ is equal to or greater than threshold value th, control unit 5 calculates parameter $TQ'_2$ on the basis of angle $\alpha2$ and first component $TQ_{mastSYM}$.

Once parameters $TQ'_1$, $TQ'_2$ are determined, control unit 5 calculates each second component $TQ_{mastASYM1}$, $TQ_{mastASYM2}$ by multiplying respective parameter $TQ'_1$, $TQ'_2$ by the respective pitch angle difference $\Delta\theta_{COLL1}$, $\Delta\theta_{COLL2}$ (block 57 in FIG. 2). Control unit 5 then calculates each rotor torque $TQ_{mast1}$, $TQ_{mast2}$ as the sum of first component $TQ_{mastSYM}$ and the respective second component $TQ_{mastASYM1}$, $TQ_{mastASYM2}$ (block 55 in FIG. 2).

Figure 5:
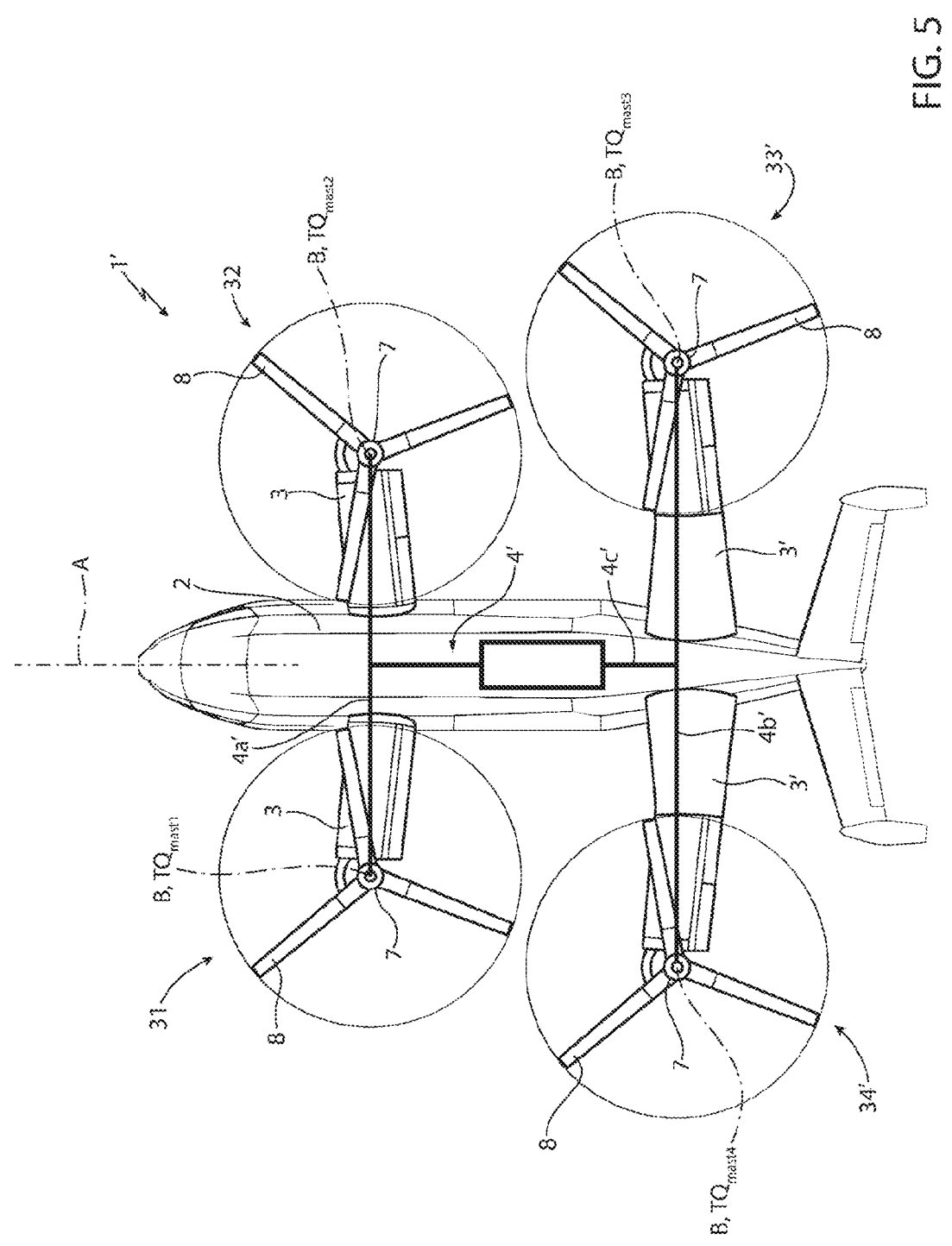
FIG. 5 shows a top view of a second embodiment of an aircraft capable of hovering comprising four rotors.

With reference to FIG. 5, 1' denotes an aircraft capable of hovering according to a second embodiment of the present invention. Aircraft 1' is similar to aircraft 1 and will be described hereinafter only insofar as it differs from the latter; equal or equivalent parts of aircrafts 1, 1' will be marked, where possible, by the same reference numerals.

Figure 7:
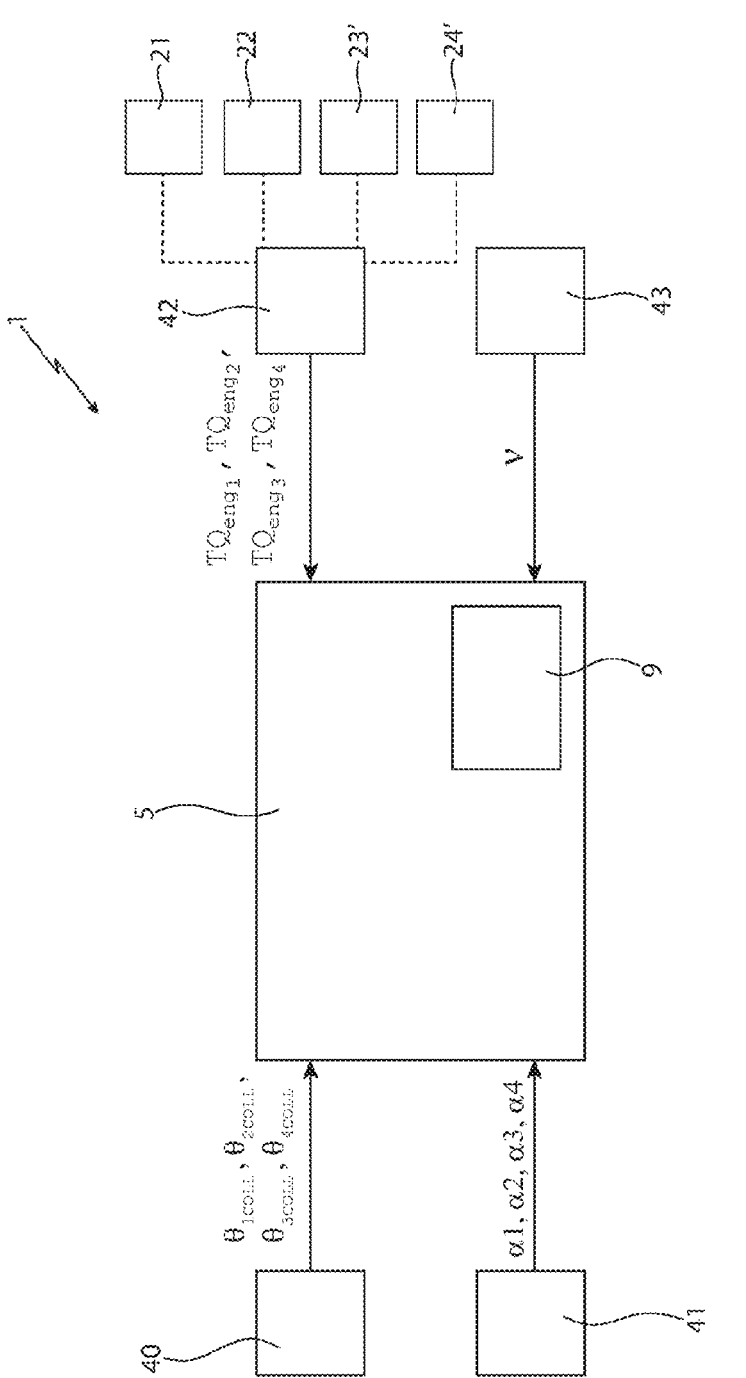
FIG. 7 is a schematic representation of some components of the aircraft of FIG. 5, with parts removed for clarity.

Aircraft 1' differs from aircraft 1 in that it comprises:

two pairs of half-wings 3, 3'; the half-wings of each pair of half-wings 3, 3' extending cantilevered from respective parts opposite one another of fuselage 2 and transversely to axis A; the two pairs of half-wings 3, 3' being distanced from each other along axis A;

four rotors 31, 32, 33', 34' operatively connected with respective engines 21, 22, 23', 24' (only schematically shown in FIG. 7).

Each rotor 31, 32, 33', 34' essentially comprises a hub 7 and a plurality of blades 8. In addition, rotors 31, 32, 33', 34' are rotatable about respective axes B with respective angular speeds $\omega1$, $\omega2$, $\omega3$ and $\omega4$, which are preferably constant over time.

Furthermore, blades 8 are articulated on the respective hub 7 in such a way that respective angles of attack $\theta1_{COLL}$, $\theta2_{COLL}$, $\theta3_{COLL}$, $\theta4_{COLL}$ are collectively adjustable relative to respective axes B.

Rotors 31, 32, 33', 34' are controllable independently of one another. In particular, the collective pitch angles $\theta1_{COLL}$, $\theta2_{COLL}$, $\theta3_{COLL}$, $\theta4_{COLL}$ may be different from one another.

Furthermore, rotors 31, 32, 33', 34' are identical to one another. In detail, rotors 31, 32, 33', 34' have the same power required for the same input.

In addition, rotors 31, 32 are tiltable with respect to respective axes C (not-shown) relative to half-wings 3 and rotors 33', 34' are tiltable with respect to respective axes C (not-shown) relative to half-wings 3'. In detail, aircraft 1' is a quadcopter.

Aircraft 1' further comprises (FIG. 7):

sensor means 40 configured to measure collective pitch angles $\theta1_{COLL}$, $\theta2_{COLL}$, $\theta3_{COLL}$, $\theta4_{COLL}$;

sensor means 41 configured to measure angles $\alpha1$, $\alpha2$, $\alpha3$, $\alpha4$ of respective rotational axes B of rotors 31, 32, 33', 34' with respect to axis A.

Each engine 21, 22, 23', 24' is adapted to generate a respective engine torque $TQ_{eng1}$, $TQ_{eng2}$, $TQ_{eng3}$, $TQ_{eng4}$, which is transmitted at least in part to rotors 31, 32, 33', 34' by respective transmission units 6. In addition, each rotor 31, 32, 33', 34' is rotatable relative to the respective rotational axis B under the action of respective rotor torques $TQ_{mast1}$, $TQ_{mast2}$, $TQ_{mast3}$, $TQ_{mast4}$, which are correlated to engine torques $TQ_{eng1}$ and/or $TQ_{eng2}$ and/or $TQ_{eng3}$ and/or $TQ_{eng4}$.

Furthermore, rotors 31, 32, 33', 34' are operatively connected to one another. In particular, convertiplane 1' comprises an interconnection mechanism 4', which is operatively connected to rotors 31, 32, 33', 34' (FIG. 5).

Interconnection mechanism 4' is adapted to allow the rotation of rotors 31, 32, 33', 34' in case of failure of one of engines 21, 22, 23', 24'.

In detail, each engine 21, 22, 23', 24' is coaxial to the respective rotor 31, 32, 33', 34' and interconnection mechanism 4' comprises (FIG. 5):

an interconnection shaft 4a', which operatively connects engine 21 to engine 22;

an interconnection shaft 4b', which operatively connects engine 23' to engine 24'; and an interconnection shaft 4c', which operatively connects interconnection shaft 4a' to interconnection shaft 4b'.

Aircraft 1' further comprises (FIG. 7):

sensor means 42 configured to measure engine torques $TQ_{eng1}$, $TQ_{eng2}$, $TQ_{eng3}$, $TQ_{eng4}$ generated by respective engines 21, 22, 23', 24'; and sensor means 43 configured to measure the airspeed v of aircraft 1'.

Control unit 5 is configured to calculate a first component $TQ_{mastSYM}$ of rotor torques $TQ_{mast1}$, $TQ_{mast2}$, $TQ_{mast3}$, $TQ_{mast4}$ on the basis of engine torques $TQ_{eng1}$, $TQ_{eng2}$, $TQ_{eng3}$, $TQ_{eng4}$. In detail, first component $TQ_{mastSYM}$ is equal to rotor torques $TQ_{mast1}$, $TQ_{mast2}$, $TQ_{mast3}$, $TQ_{mast4}$ when collective pitch angles $\theta1_{COLL}$, $\theta2_{COLL}$, $\theta3_{COLL}$, $\theta4_{COLL}$ are equal to one another.

For the purpose of calculating first component $TQ_{mastSYM}$, control unit 5 is configured to (FIG. 6):

receive from sensor means 42 the signal associated with the measured values of engine torques $TQ_{eng1}$, $TQ_{eng2}$, $TQ_{eng3}$, $TQ_{eng4}$;

calculating a total engine torque $TQ_{engTOT}$ generated by engines 21, 22, 23' and 24' as the sum of the engine torques $TQ_{eng1}$, $TQ_{eng2}$, $TQ_{eng3}$, $TQ_{eng4}$ (block 50);

subtracting from the total engine torque $TQ_{engTOT}$ a term corresponding to the transmission losses due to the transmission of engine torques $TQ_{eng1}$, $TQ_{eng2}$, $TQ_{eng3}$, $TQ_{eng4}$ (or part thereof) from engines 21, 22, 23', 24' to rotors 31, 32, 33', 34' (block 51) through transmission units 6; and/or subtracting from the total engine torque $TQ_{engTOT}$ the torque $TQ_{acc}$ for powering the accessories of aircraft 1', where present (block 52).

The difference between total engine torque $TQ_{engTOT}$ and the transmission losses and/or torque $TQ_{acc}$ is the total available engine torque $TQ_{engavail}$.

Figure 6:
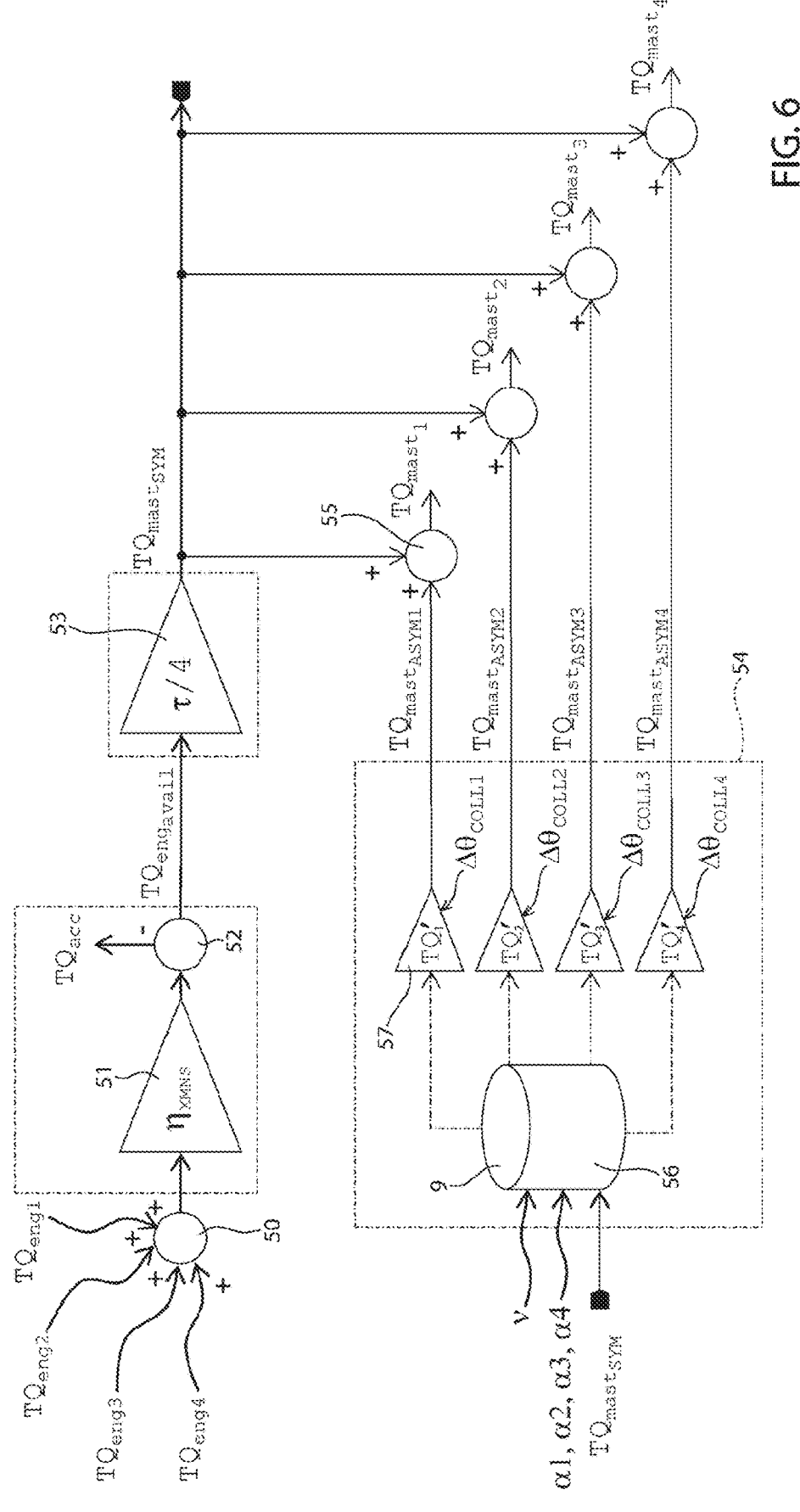
FIG. 6 is a block diagram related to the method according to the present invention for estimating the torques of the aircraft of FIG. 5.

Control unit 5 is further configured to calculate first component $TQ_{mastSYM}$ by dividing the total available engine torque $TQ_{engavail}$ by four, which is the number of rotors 31, 32, 33', 34' of aircraft 1' (block 53 in FIG. 6).

Advantageously, control unit 5 is configured to:

receive the signal associated with collective pitch angles $\theta1_{COLL}$, $\theta2_{COLL}$, $\theta3_{COLL}$, $\theta4_{COLL}$ of rotors 31, 32, 33', 34' from sensor means 40; and calculate a second component $TQ_{mastASYM1}$, $TQ_{mastASYM2}$, $TQ_{mastASYM3}$, $TQ_{mastASYM4}$ of each rotor torque $TQ_{mast1}$, $TQ_{mast2}$, $TQ_{mast3}$, $TQ_{mast4}$ on the basis of at least pitch angle differences $\Delta\theta_{COLL1}$, $\Delta\theta_{COLL2}$, $\Delta\theta_{COLL3}$, $\Delta\theta_{COLL4}$ between collective pitch angles $\theta1_{COLL}$, $\theta2_{COLL}$, $\theta3_{COLL}$, $\theta4_{COLL}$ (block 54 of FIG. 6).

In particular, second components $TQ_{mastASYM1}$, $TQ_{mastASYM2}$, $TQ_{mastASYM3}$, $TQ_{mastASYM4}$ represent how much the rotor torque $TQ_{mast1}$, $TQ_{mast2}$, $TQ_{mast3}$, $TQ_{mast4}$ of each rotor 31, 32, 33', 34' deviates from the rotor torque that would act on each rotor 31, 32, 33', 34' if total available engine torque $TQ_{engavail}$ were equally apportioned between rotors 31, 32, 33', 34'.

Control unit 5 is further configured to calculate rotor torques $TQ_{mast1}$, $TQ_{mast2}$, $TQ_{mast3}$, $TQ_{mast4}$ as an algebraic sum of first component $TQ_{mastSYM}$ (which is common to all rotors 31, 32, 33', 34') and the respective second component $TQ_{mastASYM1}$, $TQ_{mastASYM2}$, $TQ_{mastASYM3}$, $TQ_{mastASYM4}$ ($TQ_{mast1}=TQ_{mastSYM}+TQ_{mastASYM1}$; $TQ_{mast2}=TQ_{mastSYM}+TQ_{mastASYM2}$; $TQ_{mast3}=TQ_{mastSYM}+TQ_{mastASYM3}$; $TQ_{mast4}=TQ_{mastSYM}+TQ_{mastASYM4}$;) (block 55 in FIG. 6).

In particular, if the collective pitch angle $\theta1_{COLL}$, $\theta2_{COLL}$, $\theta3_{COLL}$, $\theta4_{COLL}$ is the same for the four rotors, the second components $TQ_{mastASYM1}$, $TQ_{mastASYM2}$, $TQ_{mastASYM3}$, $TQ_{mastASYM4}$ are null and the rotor torques $TQ_{mast1}$, $TQ_{mast2}$, $TQ_{mast3}$, $TQ_{mast4}$ are equal to one another and to the first component $TQ_{mastSYM}$ ($TQ_{mast1}=TQ_{mast2}=TQ_{mast3}=TQ_{mast4}=TQ_{mastSYM}$).

More specifically, for the purpose of calculating the second component $TQ_{mastASYM1}$, $TQ_{mastASYM2}$, $TQ_{mastASYM3}$, $TQ_{mastASYM4}$ of each rotor 31, 32, 33', 34' (block 54), control unit 5 is configured to (FIG. 6):

determine parameters $TQ'_1$, $TQ'_2$, $TQ'_3$, $TQ'_4$, which are respectively associated with the variation of the respective rotor torque $TQ_{mast1}$, $TQ_{mast2}$, $TQ_{mast3}$, $TQ_{mast4}$ as a result of a variation of collective pitch angle $\theta1_{COLL}$, $\theta2_{COLL}$, $\theta3_{COLL}$, $\theta4_{COLL}$ of the same rotor 31, 32, 33', 34' (block 56); and multiply each parameter $TQ'_1$, $TQ'_2$, $TQ'_3$, $TQ'_4$ by the pitch angle difference $\Delta\theta_{COLL1}$, $\Delta\theta_{COLL2}$, $\Delta\theta_{COLL3}$, $\Delta\theta_{COLL4}$ of the respective rotor 31, 32, 33', 34 (block 57).

Control unit 5 is configured to calculate each parameter $TQ'_1$, $TQ'_2$, $TQ'_3$, $TQ'_4$ on the basis of at least two independent variables associated with the performance of the respective rotor 31, 32, 33', 34'. In detail, each parameter $TQ'_1$, $TQ'_2$, $TQ'_3$, $TQ'_4$ is calculated on the basis of:

the respective angle $\alpha1$, $\alpha2$, $\alpha3$, $\alpha4$ measured by sensor means 41; and airspeed v measured by sensor means 43; and/or first component $TQ_{mastSYM}$.

In detail, database 9 comprises data correlating parameter TQ' with angle α1, α2, α3, α4, airspeed v and first component $TQ_{mastSYM}$.

In further detail, control unit 5 is configured to:
calculate each parameter $TQ'_1$, $TQ'_2$, $TQ'_3$, $TQ'_4$ on the basis of airspeed v, if the respective angle α1, α2, α3, α4 is lower than or equal to a threshold value th; and
calculate each parameter $TQ'_1$, $TQ'_2$, $TQ'_3$, $TQ'_4$ on the basis of first component $TQ_{mastSYM}$, if the respective angle α1, α2, α3, α4 is greater than threshold value th.

Since rotors 31, 32, 33', 34' are identical to one another, if angles α1, α2, α3, α4 are equal to one another, parameters $TQ'_1$, $TQ'_2$, $TQ'_3$, $TQ'_4$ are also equal to one another.

Pitch angle differences $\Delta\theta_{COLL1}$, $\Delta\theta_{COLL2}$, $\Delta\theta_{COLL3}$, $\Delta\theta_{COLL4}$ of rotors 31, 32, 33', 34' are respective differences between each collective pitch angle $\theta1_{COLL}$, $\theta2_{COLL}$, $\theta3_{COLL}$, $\theta4_{COLL}$ and a symmetric collective pitch angle θ0 ($\Delta\theta_{COLL1}=\theta1_{COLL}-\theta0$; $\Delta\theta_{COLL2}=\theta2_{COLL}-\theta0$; $\Delta\theta_{COLL3}=\theta3_{COLL}-\theta0$; $\Delta\theta_{COLL4}=\theta4_{COLL}-\theta0$). In detail, symmetric collective pitch angle θ0 is calculated as the sum of collective pitch angles $\theta1_{COLL}$, $\theta2_{COLL}$, $\theta3_{COLL}$, $\theta4_{COLL}$ divided by four, which is the number of rotors 31, 32, 33', 34' of aircraft 1' ($\theta0=(\theta1_{COLL}+\theta2_{COLL}+\theta3_{COLL}+\theta4_{COLL})/4$).

In use, control unit 5 calculates an estimate of rotor torques $TQ_{mast1}$, $TQ_{mast2}$, $TQ_{mast3}$, $TQ_{mast4}$ as an algebraic sum of first component $TQ_{mastSYM}$ and respective second components $TQ_{mastASYM1}$, $TQ_{mastASYM2}$, $TQ_{mastASYM3}$, $TQ_{mastASYM4}$.

The description of the steps required to calculate first component $TQ_{mastSYM}$ of rotor torques $TQ_{mast1}$, $TQ_{mast2}$, $TQ_{mast3}$, $TQ_{mast4}$ of aircraft 1' is similar to the description of the steps required to calculate first component $TQ_{mastSYM}$ of rotor torques $TQ_{mast1}$, $TQ_{mast2}$ of aircraft 1 and will be omitted for the sake of brevity.

The following is a description of the steps required to calculate second components $TQ_{mastASYM1}$, $TQ_{mastASYM2}$, $TQ_{mastASYM3}$, $TQ_{mastASYM4}$.

Periodically, sensor means 40 measure collective pitch angles $\theta1_{COLL}$, $\theta2_{COLL}$, $\theta3_{COLL}$, $\theta4_{COLL}$ of rotors 31, 32, 33', 34', sensor means 41 measure angles α1, α2, α3, α4 and sensor means 43 measure airspeed v.

Control unit 5 calculates pitch angle differences $\Delta\theta_{COLL1}$, $\Delta\theta_{COLL2}$, $\Delta\theta_{COLL3}$, $\Delta\theta_{COLL4}$ between collective pitch angles $\theta1_{COLL}$, $\theta2_{COLL}$, $\theta3_{COLL}$, $\theta4_{COLL}$. In addition, control unit 5 accesses database 9 using angle α1, α2, α3, α4, airspeed v and/or first component $TQ_{mastSYM}$ as inputs and determines parameters $TQ'_1$, $TQ'_2$, $TQ'_3$, $TQ'_4$ on the basis of the data stored in database 9.

In detail, each pitch angle difference $\Delta\theta_{COLL1}$, $\Delta\theta_{COLL2}$, $\Delta\theta_{COLL3}$, $\Delta\theta_{COLL4}$ is calculated by subtracting symmetric collective pitch angle θ0 from collective pitch angles $\theta1_{COLL}$, $\theta2_{COLL}$, $\theta3_{COLL}$, $\theta4_{COLL}$ of respective rotors 31, 32, 33', 34'.

Subsequently, control unit 5 calculates second components $TQ_{mastASYM1}$, $TQ_{mastASYM2}$, $TQ_{mastASYM3}$, $TQ_{mastASYM4}$ as multiplications of respective parameters $TQ'_1$, $TQ'_2$, $TQ'_3$, $TQ'_4$ by respective pitch angle differences $\Delta\theta_{COLL1}$, $\Delta\theta_{COLL2}$, $\Delta\theta_{COLL3}$, $\Delta\theta_{COLL4}$.

Control unit 5 then calculates each rotor torque $TQ_{mast1}$, $TQ_{mast2}$, $TQ_{mast3}$, $TQ_{mast4}$ as the sum of first component $TQ_{mastSYM}$ and the respective second component $TQ_{mastASYM1}$, $TQ_{mastASYM2}$, $TQ_{mastASYM3}$, $TQ_{mastASYM4}$.

Figure 8:
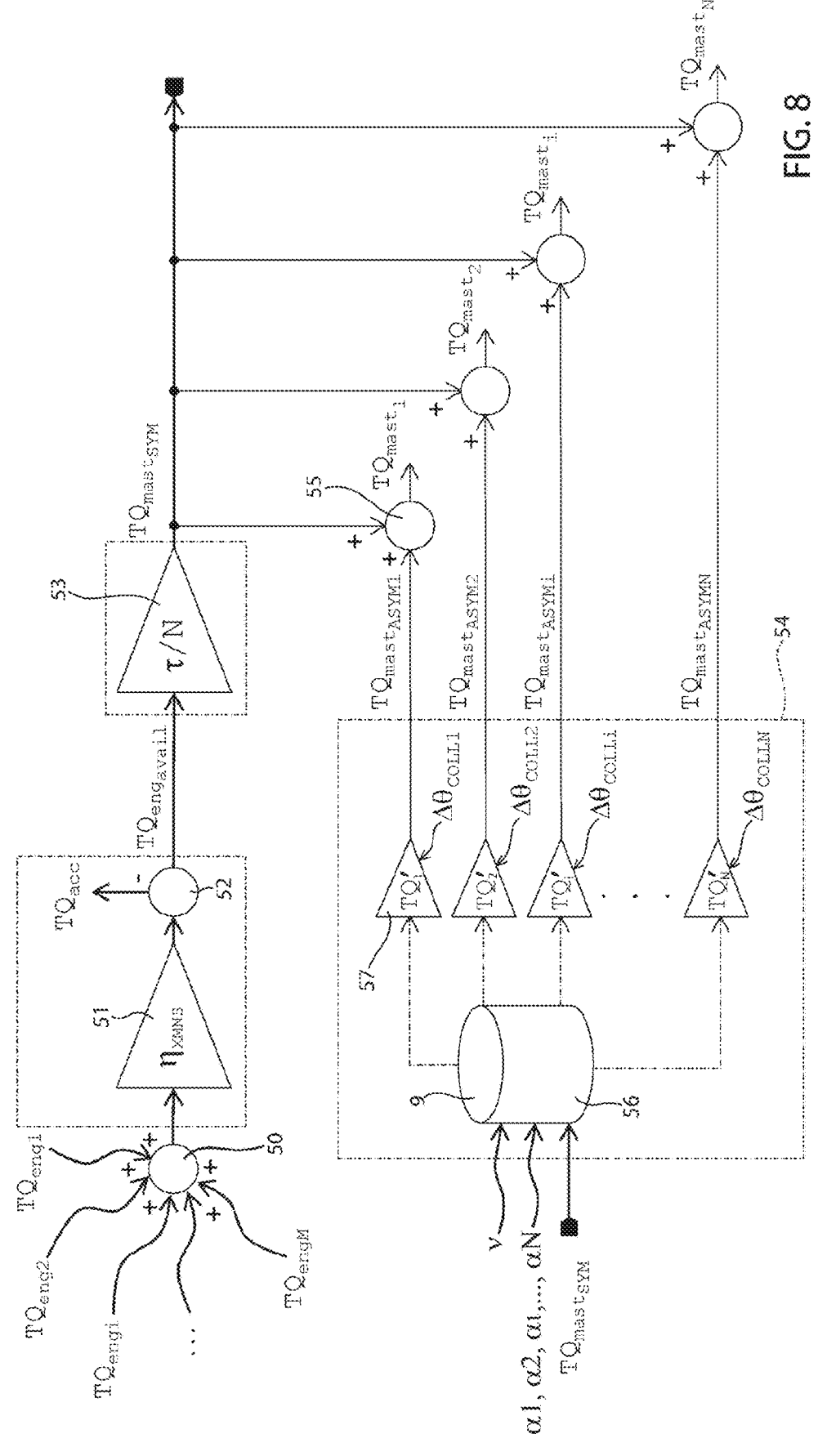
FIG. 8 is a block diagram related to the method according to the present invention for estimating the torques of a third embodiment of an aircraft capable of hovering comprising any number of rotors.

FIG. 8 illustrates a block diagram related to a method for estimating the rotor torques of an aircraft 1" capable of hovering (not shown) according to a second embodiment of the present invention comprising N operatively interconnected and identical rotors. In detail, N is a natural number greater than one. In addition, N may be an even or an odd number.

Aircraft 1" further comprises M engines operatively connected to the N rotors. In detail, M is a natural number greater than or equal to one; M might be equal to or different from N.

Aircraft 1" is a generalization of aircrafts 1 and 1'. Accordingly, equal or equivalent parts of aircrafts 1, 1', 1" will be marked, where possible, by the same reference numerals. In detail, aircraft 1" is a multicopter.

According to the estimation method shown in FIG. 8, control unit 5 of aircraft 1" is configured to calculate a first component $TQ_{mastSYM}$ of rotor torques $TQ_{mast1}$, $TQ_{mast2}$, ..., $TQ_{mastN}$ on the basis of engine torques $TQ_{eng1}$, $TQ_{eng2}$, ..., $TQ_{engM}$. In detail, first component $TQ_{mastSYM}$ is equal to rotor torques $TQ_{mast1}$, $TQ_{mast2}$, ..., $TQ_{mastN}$ when collective pitch angles $\theta1_{COLL}$, $\theta2_{COLL}$, ..., $\theta N_{COLL}$ are equal to one another.

For the purpose of calculating first component $TQ_{mastSYM}$, control unit 5 is configured to (FIG. 8):
receive from sensor means 42 the signal associated with the measured values of engine torques $TQ_{eng1}$, $TQ_{eng2}$, ..., $TQ_{engM}$;
calculating a total engine torque $TQ_{engTOT}$ generated by the engines operatively connected to the rotors of aircraft 1" as the sum of the engine torques $TQ_{eng1}$, $TQ_{eng2}$, ..., $TQ_{engM}$ (block 50);
subtracting from the total engine torque $TQ_{engTOT}$ a term corresponding to the transmission losses due to the transmission of engine torques $TQ_{eng1}$, $TQ_{eng2}$, ..., $TQ_{engM}$ (or part thereof) from the M engines (block 51) through transmission units 6; and/or
subtracting from the total engine torque $TQ_{engTOT}$ the torque $TQ_{acc}$ for powering the accessories of aircraft 1", where present (block 52).

The difference between total engine torque $TQ_{engTOT}$ and the transmission losses and/or torque $TQ_{acc}$ is the total available engine torque $TQ_{engavail}$.

Control unit 5 is further configured to calculate first component $TQ_{mastSYM}$ by dividing the total available engine torque $TQ_{engavail}$ by the number of rotors N of aircraft 1" (block 53 in FIG. 8, formula a)):

$$TQ_{mastSYM} = \frac{TQeng_{avail}}{N} \qquad \text{a)}$$

Advantageously, control unit 5 is configured to:
receive the signal associated with collective pitch angles $\theta1_{COLL}$, $\theta2_{COLL}$, ..., $\theta N_{COLL}$ of the N rotors from sensor means 40; and
calculate a second component $TQ_{mastASYM1}$, $TQ_{mastASYM2}$, ..., $TQ_{mastASYMN}$ of each rotor torque $TQ_{mast1}$, $TQ_{mast2}$, ..., $TQ_{mastN}$ on the basis of at least pitch angle differences $\Delta\theta_{COLL1}$, $\Delta\theta_{COLL2}$, ..., $\Delta\theta_{COLLN}$ between collective pitch angles $\theta1_{COLL}$, $\theta2_{COLL}$, ..., $\theta N_{COLL}$ (block 54 of FIG. 8).

In particular, second components $TQ_{mastASYM1}$, $TQ_{mastASYM2}$, ..., $TQ_{mastASYMN}$ represent how much the rotor torque $TQ_{mast1}$, $TQ_{mast2}$, ..., $TQ_{mastN}$ of each rotor deviates from the rotor torque that would act on each of the rotors if total available engine torque $TQ_{engavail}$ were equally apportioned between the rotors.

Control unit 5 is further configured to calculate rotor torques $TQ_{mast1}$, $TQ_{mast2}$, ..., $TQ_{mastN}$ as an algebraic sum of first component $TQ_{mastSYM}$ (which is common to all rotors of aircraft $1$") and the respective second component $TQ_{mastASYM1}$, $TQ_{mastASYM2}$, . . . , $TQ_{mastASYMN}$ (block 55 in FIG. 8, formula b)):

$$TQ_{masti} = TQ_{mastSYM} + TQ_{mastASYM_i}, \quad i = 1:N \qquad \text{b)}$$

In particular, if the collective pitch angle $\theta1_{COLL}$, $\theta2_{COLL}$, . . . , $\theta N_{COLL}$ is the same for the N rotors, the second components $TQ_{mastASYM1}$, $TQ_{mastASYM2}$, . . . , $TQ_{mastASYMN}$ are null and the rotor torques $TQ_{mast1}$, $TQ_{mast2}$, . . . , $TQ_{mastN}$ are equal to one another and to the first component $TQ_{mastSYM}$ ($TQ_{mast1}=TQ_{mast2}= . . . =TQ_{mastN}=TQ_{mastSYM}$).

More specifically, for the purpose of calculating second components $TQ_{mastASYM1}$, $TQ_{mastASYM2}$, . . . , $TQ_{mastASYMN}$, control unit 5 is configured to (FIG. 8):

determine parameters $TQ'_1$, $TQ'_2$, . . . , $TQ'_N$, which are respectively associated with the variation of the respective rotor torque $TQ_{mast1}$, $TQ_{mast2}$, . . . , $TQ_{mastN}$ as a result of a variation of collective pitch angle $\theta1_{COLL}$, $\theta2_{COLL}$, . . . , $\theta N_{COLL}$ of the same rotor (block 56); and multiply each parameter $TQ'_1$, $TQ'_2$, . . . , $TQ'_N$ by the respective pitch angle difference $\Delta\theta_{COLL1}$, $\Delta\theta_{COLL2}$, . . . , $\Delta\theta_{COLLN}$ (block 57, formula c)):

$$TQ_{mastASYM_i} = \Delta\theta_{COLLi} \cdot TQ'_i, \quad i = 1:N \qquad \text{c)}$$

Control unit 5 is configured to calculate each parameter $TQ'_1$, $TQ'_2$, . . . , $TQ'_N$ on the basis of at least two independent variables associated with the performance of the respective rotor. In detail, each parameter $TQ'_1$, $TQ'_2$, . . . , $TQ'_N$ is calculated on the basis of:

the angle $\alpha1$, $\alpha2$, . . . , $\alpha N$ of the respective rotor measured by sensor means 41; and airspeed v measured by sensor means 43; and/or first component $TQ_{mastSYM}$.

In detail, database 9 comprises data correlating parameters $TQ'_1$, $TQ'_2$, . . . , $TQ'_N$ with angles $\alpha1$, $\alpha2$, . . . , $\alpha N$, airspeed v and first component $TQ_{mastSYM}$.

In further detail, control unit 5 is configured to:

calculate each parameter $TQ'_1$, $TQ'_2$, . . . , $TQ'_N$ on the basis of airspeed v, if the respective angle $\alpha1$, $\alpha2$, . . . , $\alpha N$ is lower than or equal to a threshold value th; and calculate each parameter $TQ'_1$, $TQ'_2$, . . . , $TQ'_N$ on the basis of first component $TQ_{mastSYM}$, if the respective angle $\alpha1$, $\alpha2$, . . . , $\alpha N$ is greater than threshold value th.

Since rotors N are identical to one another, if angles $\alpha1$, $\alpha2$, . . . , $\alpha N$ are equal to one another, parameters $TQ'_1$, $TQ'_2$, . . . , $TQ'_N$ are also equal to one another.

Pitch angle differences $\Delta\theta_{COLL1}$, $\Delta\theta_{COLL2}$, . . . , $\Delta\theta_{COLLN}$ are respective differences between each collective pitch angle $\theta1_{COLL}$, $\theta2_{COLL}$, . . . , $\theta4_{COLL}$ and a symmetric collective pitch angle $\theta0$ (formula d)):

$$\Delta\theta_{COLLi} = \theta_{iCOLL} - \theta0, \quad i = 1:N \qquad \text{d)}$$

In detail, symmetric collective pitch angle $\theta0$ is calculated as the sum of collective pitch angles $\theta1_{COLL}$, $\theta2_{COLL}$, . . . , $\theta N_{COLL}$ divided by the number N of rotors (formula e)):

$$\theta0 = \frac{1}{N} \cdot \sum_{i=1}^{N} \theta_{iCOLL} \qquad \text{e)}$$

From an examination of the characteristics of the method for estimating the rotor torques $TQ_{mast1}$, $TQ_{mast2}$, . . . , $TQ_{mastN}$, control unit 5 and aircraft 1, 1', 1" according to the present invention, the advantages they allow obtaining are evident.

In particular, rotor torques $TQ_{mast1}$, $TQ_{mast2}$ of convertiplane 1 are calculated as the algebraic sum of first component $TQ_{mastSYM}$, which is equal to rotor torques $TQ_{mast1}$, $TQ_{mast2}$ when collective pitch angles $\theta1_{COLL}$, $\theta2_{COLL}$ are equal to each other, and respective second components $TQ_{mastASYM1}$, $TQ_{mastASYM2}$, which represents how much the rotor torque $TQ_{mast1}$, $TQ_{mast2}$ of each rotor 31, 32 deviates from the rotor torque that would act on each rotor 31, 32 if total available engine torque $TQ_{engavail}$ were equally apportioned between rotors 31 and 32. Therefore, the rotor torques $TQ_{mast1}$, $TQ_{mast2}$ of rotors 31, 32, which are independently controllable from each other, can be efficiently and reliably estimated even in situations in which collective pitch angles $\theta1_{COLL}$, $\theta2_{COLL}$ are different from each other and without any physical sensor for directly measuring the rotor torques $TQ_{mast1}$, $TQ_{mast2}$.

Indeed, it has been observed that the rotor torques $TQ_{mast1}$, $TQ_{mast2}$ estimated by combining first and second components $TQ_{mastSYM}$, $TQ_{mastASYM1}$, $TQ_{mastASYM2}$ are comparable to and more reliable than the rotor torques directly measured by the physical sensors mentioned in the introductory part of the description.

The estimation method according to the present invention also allows the rotor torques of an aircraft comprising any number of rotors to be efficiently estimated. Furthermore, control unit 5 comprises database 9, in which data correlating parameters $TQ'_1$, $TQ'_2$, . . . , $TQ'_N$ with variables associated with the flight conditions of convertiplane 1 are stored. Therefore, parameters $TQ'_1$, $TQ'_2$, . . . , $TQ'_N$ and second components $TQ_{mastASYM1}$, $TQ_{mastASYM2}$, . . . , $TQ_{mastASYMN}$ are calculable on the basis of a limited number of independent variables.

The fact that parameters $TQ'_1$, $TQ'_2$, . . . , $TQ'_N$ can be determined on the basis of a limited number of variables allows to improve the robustness of the estimation method, because fewer errors due to false dependencies on other variables are possible.

In addition, since angles $\alpha1$, $\alpha2$, . . . , $\alpha N$ corresponding to the orientation of axes B of the respective rotors are taken into account when determining parameters $TQ'_1$, $TQ'_2$, . . . , $TQ'_N$, second components $TQ_{mastASYM1}$, $TQ_{mastASYM2}$, . . . , $TQ_{mastASYMN}$ are calculated regardless of whether the M engines are tilted integrally with the N rotors or are fixed with respect to fuselage 2.

Finally, it is clear that modifications and variations can be made to the method, the control unit 5 and the aircraft 1, 1', 1" previously described without thereby departing from the scope of protection of the present invention.

In particular, the method according to the present invention may be implemented for estimating the rotor torques of a helicopter comprising at least two rotors, which are operatively connected to one another and have respective collective pitch angles independently controllable from one another.

Furthermore, the method according to the present invention may be implemented for estimating the rotor torques of an aircraft capable of hovering comprising at least two operatively connected and independently controllable rotors and with hybrid propulsion or full electric propulsion. In detail, the aircraft may comprise one engine or more than one engines and/or one or more electric motors.

Finally, nacelles 11, 12 and respective engines 21, 22 might be rotationally fixed with respect to axis B, being only rotors 31, 32 tiltable around axis B.

The invention claimed is:

1. A method for estimating rotor torques of an aircraft capable of hovering; said aircraft comprising:

a plurality of rotors, which are operatively connected to each other and rotatable relative to respective rotational axes under the action of respective rotor torques; and at least one first engine, which is operatively connected to said rotors and is adapted to provide said rotors with an engine torque;

said rotors each comprising a hub and a plurality of blades articulated on said respective hub in such a way that respective collective pitch angles of said plurality of blades relative to the respective rotational axis are adjustable;

said method comprising the steps of:

i) calculating a symmetric component of said rotor torques on the basis of said engine torque; said symmetric component being equal to said rotor torques, when said collective pitch angles are equal to each other;

characterized in that it comprises the further steps of:

ii) receiving a signal associated with said collective pitch angles;

iii) calculating an asymmetric component of each said rotor torques on the basis of at least a pitch angle difference between said collective pitch angles; and iv) calculating each said rotor torque as the algebraic sum of said symmetric component and said respective asymmetric component.

2. The method according to claim 1, wherein said rotors are associated with respective pitch angle differences;

characterized in that said step iii) of calculating said asymmetric component of each said rotor torques comprises the steps of:

v) determining a parameter associated with a variation of each said rotor torque with respect to a variation of said collective pitch angle of the same rotor; and vi) multiplying each said parameter by said respective pitch angle difference of the respective rotor.

3. The method according to claim 2, characterized in that said step v) comprises the step vii) of determining said parameters on the basis of at least two independent variables associated with the flight conditions of said aircraft.

4. The method according to claim 3, characterized in that said independent variables include:

an angle corresponding to an orientation of said rotational axes of said rotors with respect to a reference system fixed to said aircraft;

the airspeed of said aircraft; and/or said symmetric component calculated at said step i).

5. The method according to claim 4, characterized in that said step vii) comprises the further steps of:

viii) determining each said parameter on the basis of said airspeed, if the angle of the respective rotor is lower than or equal to a threshold value; and ix) determining each said parameter on the basis of said symmetric component, if the angle of the respective rotor is greater than said threshold value.

6. The method according to claim 1, wherein said aircraft further comprises a second engine, which is operatively connected to said rotors and is adapted to provide said rotors with a further engine torque;

characterized in that said step i) comprises the steps of:

x) calculating a total torque produced by said first engine and second engine as the sum of said engine torque and said further engine torque;

xi) subtracting from said total torque a first subtrahend term corresponding to the transmission losses due to the transmission of said engine torque and said further engine torque from said first engine and said second engine to said rotors; and/or subtracting from said total torque a second subtrahend term corresponding to loads imparted by said first engine and/or said second engine to accessories of said aircraft; and xii) dividing said sum obtained after said step xi) by the number of rotors of said aircraft.

7. The method according to claim 2, characterized in that the pitch angle difference of each said rotor is a difference between said respective collective pitch angle of the same rotor and a symmetric collective pitch angle;

said symmetric collective pitch angle being the sum of collective pitch angles of all rotors divided by the number of said rotors.

8. Control unit for an aircraft capable of hovering; said control unit being programmed to:

calculate a symmetric component of rotor torques of rotors of said aircraft on the basis of an engine torque provided to said rotors by at least one first engine of said aircraft; said symmetric component being equal to said rotor torques, when collective pitch angles of respective rotors are, in use, equal to each other;

said control unit being characterized in that it is further programmed to:

receive a signal associated with said collective pitch angles;

calculate an asymmetric component of each said rotor torque on the basis of at least a pitch angle difference of the respective rotor; and calculate each said rotor torque as the algebraic sum of said symmetric component and said respective asymmetric component.

9. Control unit according to claim 8, characterized in that it is configured to:

determine a parameter associated with a variation of each said rotor torque with respect to a variation of said collective pitch angle of the same rotor;

multiply each said parameter by said respective pitch angle difference.

10. Control unit according to claim 9, characterized in that it is configured to calculate each said parameter on the basis of at least two independent variables associated with the flight conditions of said aircraft.

11. Control unit according to claim 10, characterized in that said independent variables include:

an angle corresponding to an orientation of said rotational axes of each said rotors with respect to a reference system of said aircraft;

airspeed of said aircraft; and/or said symmetric component.

12. Control unit according to claim 11, characterized in that it is configured to:

calculate each said parameter on the basis of said airspeed, if said respective angle is lower than a threshold value; and calculate each said parameter on the basis of said symmetric component, if said respective angle is equal to or greater than said threshold value.

13. Control unit according to claim 12, characterized in that it is configured to:

calculate a total torque produced by said first engine and at least one second engine as the sum of said engine torque and a further engine torque of said second engine;

subtract from said total torque a first subtrahend term corresponding to the transmission losses due to the transmission of said engine torques from said first and second engines to said rotors; and/or subtract from said total torque a second subtrahend term corresponding to loads imparted by said first and/or second engines to accessories of said aircraft; and divide said difference obtained after the subtraction of said first and/or said second subtrahend term from said total torque by the number of rotors of said aircraft.

14. Control unit according to claim 9, characterized in that it comprises a computational unit, a memory, and at least one interface unit electrically and operatively connectable to sensor means of said aircraft;

said memory comprising, in turn, a database storing data correlating said parameter with a plurality of variables associated with the flight conditions of said aircraft.

15. Aircraft capable of hovering, comprising:

a plurality of rotors; said rotors being rotatable relative to respective rotational axes under the action of respective rotor torques; said rotors being operatively connected to each other; said rotors comprising each a hub and a plurality of blades articulated on said respective hub in such a way that respective collective pitch angles of said plurality of blades relative to the respective rotational axis are adjustable;

at least one first engine, which is operatively connected to said rotors and is adapted to provide said rotors with an engine torque;

first sensor means configured to measure said collective pitch angles; and second sensor means configured to measure said engine torque generated, in use, by said first engine;

characterized in that it comprises a control unit according to claim 8, which is operatively connected to said first and second sensor means.

16. Aircraft according to claim 15, characterized in that it comprises:

third sensor means configured to measure the angles corresponding to an orientation of said rotational axes of said rotors with respect to a reference system of said aircraft and operatively connected to said control unit; and/or fourth sensor means configured to measure an airspeed of said aircraft and operatively connected to said control unit; and/or characterized in that it is a convertiplane or a helicopter; and/or characterized by comprising a second engine operatively connected to said rotors and adapted to provide said rotors with a further engine torque.

* * * * *